United States Patent
Narasimhan

(10) Patent No.: US 9,893,907 B2
(45) Date of Patent: Feb. 13, 2018

(54) MANAGING MULTIPLE VIRTUAL AREA NETWORK MEMBERSHIPS

(71) Applicant: Hewlett-Packard Development Company, L.P., Houston, TX (US)

(72) Inventor: Partha Narasimhan, Saratoga, CA (US)

(73) Assignee: ARUBA NETWORKS, INC, Sunnyvale, CA (US)

( * ) Notice: Subject to any disclaimer, the term of this patent is extended or adjusted under 35 U.S.C. 154(b) by 26 days.

(21) Appl. No.: 14/796,476

(22) Filed: Jul. 10, 2015

(65) Prior Publication Data

US 2015/0319008 A1    Nov. 5, 2015

Related U.S. Application Data

(63) Continuation of application No. 13/194,703, filed on Jul. 29, 2011, now Pat. No. 9,100,215.

(51) Int. Cl.
| | |
|---|---|
| *H04L 12/46* | (2006.01) |
| *H04L 29/06* | (2006.01) |
| *H04L 29/12* | (2006.01) |
| *H04L 12/18* | (2006.01) |

(52) U.S. Cl.
CPC ...... *H04L 12/4641* (2013.01); *H04L 12/1886* (2013.01); *H04L 61/6059* (2013.01); *H04L 69/22* (2013.01); *H04L 61/2015* (2013.01); *H04L 61/2092* (2013.01)

(58) Field of Classification Search
CPC ......... H04L 41/12; H04L 45/00; H04L 45/02; H04L 12/4641; H04L 12/4645; H04L 12/18; H04L 12/1886; H04L 12/46
See application file for complete search history.

(56) References Cited

U.S. PATENT DOCUMENTS

| | | | |
|---|---|---|---|
| 8,155,125 B1 | 4/2012 | Borgione et al. | |
| 8,514,828 B1 * | 8/2013 | Verma ................. | H04L 12/4633 370/338 |
| 2004/0223498 A1 | 11/2004 | Sanderson et al. | |
| 2006/0031925 A1 * | 2/2006 | Natarajan ........... | H04L 12/4645 726/3 |
| 2006/0248229 A1 | 11/2006 | Sanderson et al. | |
| 2007/0071010 A1 | 3/2007 | Iyer et al. | |
| 2009/0213859 A1 | 8/2009 | De Silva et al. | |

(Continued)

*Primary Examiner* — Feben M Haile
(74) *Attorney, Agent, or Firm* — Hewlett Packard Enterprise Patent Department

(57) ABSTRACT

To facilitate management and configuration of VLAN memberships associated with applications or network protocols, a network device receives a packet from a wireless station which is a member of a virtual local area network (VLAN). The network device determines whether the packet is associated with a predefined application or network protocol. If so, the network device delivers the received packet to a dedicated VLAN which is accessible only to network devices associated with the predefined application or network protocol, regardless of destination address specified within the packet. If not, the network device delivers the received packet to an address or a group of addresses specified in a header of the received packet. In some embodiments, the VLAN is divided from a VLAN pool, and the dedicated VLAN corresponds to an address space that is outside the address space of the VLAN pool.

15 Claims, 8 Drawing Sheets

(56) References Cited

U.S. PATENT DOCUMENTS

2011/0002340 A1    1/2011   Davis et al.
2011/0103284 A1    5/2011   Gundavelli et al.
2011/0142045 A1*   6/2011   Ait-Ameur ......... H04L 12/4641
                                                                  370/392

* cited by examiner

MANAGING MULTIPLE VIRTUAL AREA NETWORK MEMBERSHIPS

PRIORITY

This application is a Continuation of commonly assigned and co-pending U.S. patent application Ser. No. 13/194,703, having a filing date of Jul. 29, 2011, and entitled "MANAGING MULTIPLE VIRTUAL AREA NETWORK MEMBERSHIPS," the disclosure of which is hereby incorporated by reference in its entirety.

BACKGROUND OF THE INVENTION

The present disclosure relates to virtual area network (VLAN) membership management in a hybrid wired and wireless digital network. In particular, the present disclosure relates to management and configuration of VLAN memberships associated with applications or network protocols.

Wireless digital networks, such as networks operating under IEEE 802.11 standards, are spreading in their popularity and availability. With such popularity, however, come problems of managing Virtual Area Network (VLAN) memberships associated with specific applications or network protocols, e.g., VLAN membership management in a broadcast or multicast dependent process, such as stateless autoconfiguration.

VLANs are logical local area networks (LANs) based on physical LANs. A VLAN can be created by partitioning a physical LAN into multiple logical LANs or subnets using a VLAN identifier. Alternatively, several physical LANs can function as a single logical LAN. Multiple VLANs can be on either a single router or multiple routers. Hosts within a VLAN communicate as if they were attached to the same broadcast and/or multicast domain regardless of their physical locations. Because packets are only delivered between network ports that are designated to the same VLAN, VLAN reduces network traffic and avoids wasting bandwidth, especially in LAN environments with applications or network protocols that require broadcast and/or multicast support.

Stateless autoconfiguration allows various network devices attached to an Internet Protocol version 6 (IPv6) network to connect to the Internet without requiring any intermediate IP support from, e.g., a Dynamic Host Configuration Protocol (DHCP) server. The stateless autoconfiguration is defined in Internet Engineering Task Force (IETF) Request for Comments (RFC) 2462. At the startup of stateless autoconfiguration, a wireless station automatically creates a link-local address on each IPv6-enabled interface. IPv6 hosts typically use Neighbor Discovery Protocol (NDP) to create a globally routable unicast address based on router advertisement packet received from an IPv6 router. The global address is usually shared by all automatically configured addresses of the corresponding IPv6-enabled interface. Thus, only one multicast group needs to be joined for neighbor discovery.

Multiple VLAN memberships may cause undesirable consequences in a broadcast and/or multicast network setting. For example, in some network environments, an application or a network protocol may require broadcast and/or multicast support, and multiple wireless stations belonging to different VLANs can be associated with the same base service, e.g., the same access point. Ideally, a wireless station shall respond only to broadcast and/or multicast packets that are intended for the wireless station to receive (e.g., the broadcast and/or multicast packets from the same VLAN that the wireless station belongs to) and discard other received packets. However, under current wireless local area network (WLAN) standards, information about VLAN memberships are not transmitted within the broadcast and/or multicast packet to wireless stations. Therefore, a wireless station cannot distinguish broadcast and/or multicast packets received from different VLANs, which may cause undesirable consequences.

BRIEF DESCRIPTION OF THE DRAWINGS

The present disclosure may be best understood by referring to the following description and accompanying drawings that are used to illustrate embodiments of the present disclosure.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to VLAN membership management in a hybrid wired and wireless digital network, and particularly, management and configuration of VLAN memberships associated with applications or network protocols requiring support for broadcast and/or multicast.

Embodiments of the present disclosure provide a solution that creates a VLAN specific to an application or a network protocol so as to facilitate configuring and managing VLAN memberships in a network environment which involves multiple VLANs. With the solution provided herein, network packets received at an access point are checked to determine whether they are specific to a preconfigured application or network protocol. If so, the received network packets are delivered to a dedicated VLAN created specifically for the application or the network protocol. The dedicated VLAN can be a VLAN selected from a VLAN pool or a VLAN created outside an existing VLAN pool.

In some embodiments, the dedicated VLAN may be associated with IPv6 network traffic. In some embodiments, the dedicated VLAN may be associated with multicast. In some embodiments, the dedicated VLAN may be associated with Voice-over-Internet Protocol (VoIP) and/or video streaming packets.

Computing Environment

Figure 1A:
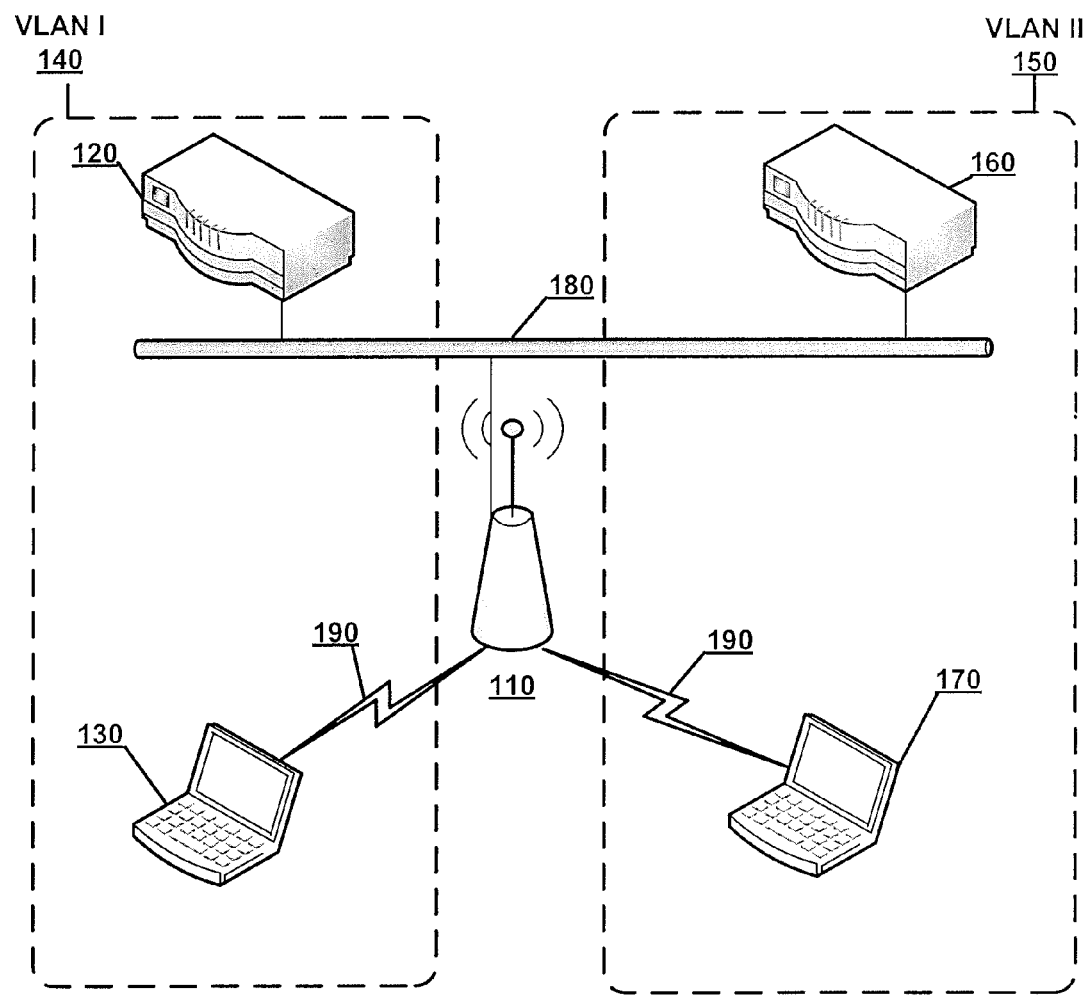
FIG. 1A shows an exemplary hybrid wired and wireless digital network environment according to embodiments of the present disclosure.

FIG. 1A shows an exemplary hybrid wired and wireless digital network environment according to embodiments of the present disclosure. FIG. 1A includes two VLANs, namely VLAN I 140 and VLAN II 150, a plurality of network devices, such as, routers 120 and 160, wireless stations 130 and 170, access point 110, etc. For illustrative purposes only, router 120 and wireless station 130 are members of VLAN I 140; router 160 and wireless station 170 are members of VLAN II 150. Routers 120 and 160 are coupled to access point 110 through wired connection 180. Multiple wireless stations, e.g. wireless stations 130 and 170, are coupled to access point 110 through wireless connection 190. Broadcast and/or multicast packets, which are originated from either router 120 or router 160, are delivered to both wireless station 130 and wireless station 170 through access point 110. Likewise, packets originated from wireless station 130 or 170 are delivered to both router 120 and router 160 through access point 110.

Figure 1B:
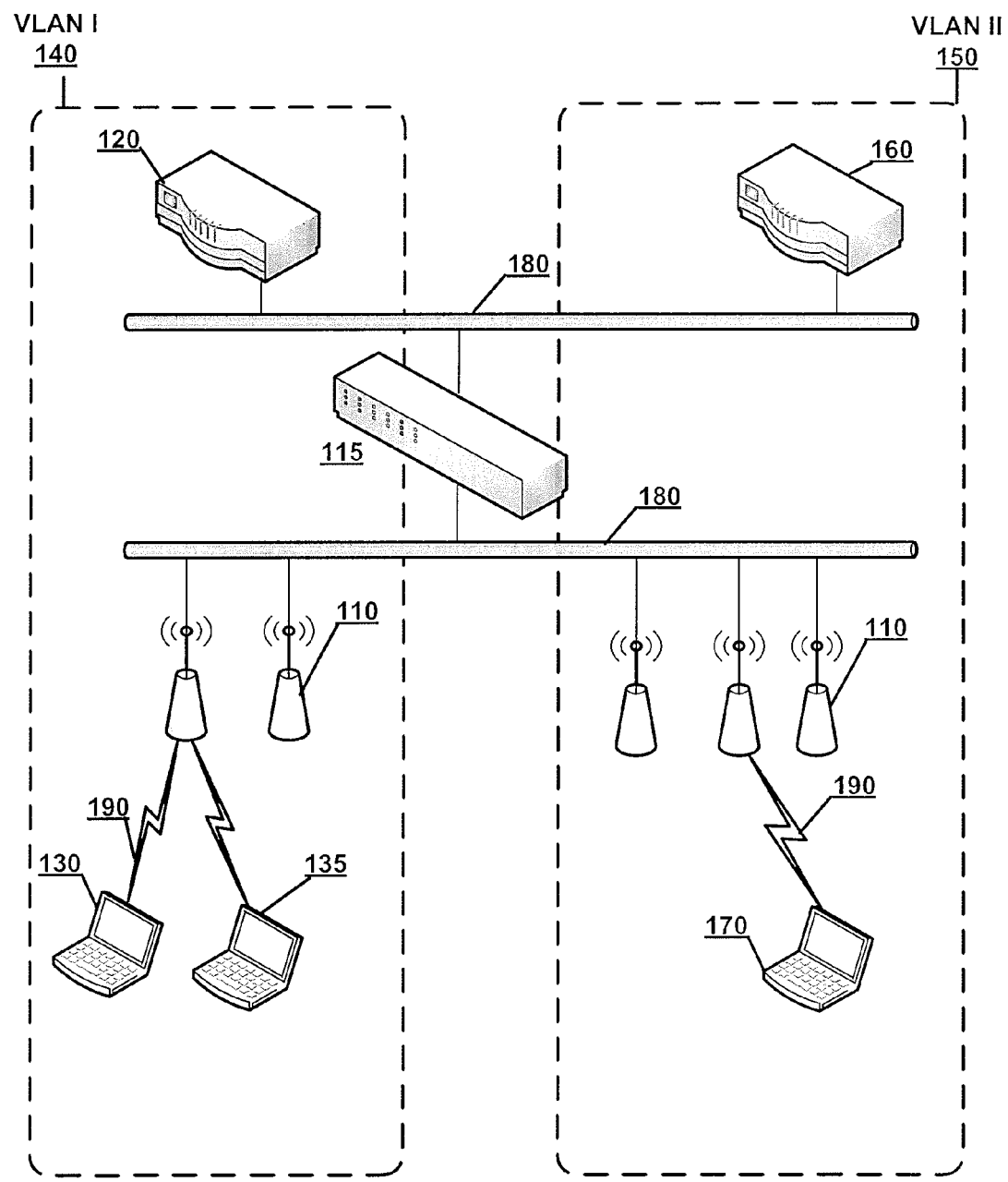
FIG. 1B shows another exemplary hybrid wired and wireless digital network environment according to embodiments of the present disclosure.

FIG. 1B shows another exemplary hybrid wired and wireless digital network environment according to embodiments of the present disclosure. FIG. 1B includes two VLANs, namely VLAN I 140 and VLAN II 150, a plurality of network devices, such as, routers 120 and 160, wireless stations 130, 135, and 170, a controller 115, a plurality of access points 110, etc. For illustrative purposes only, router 120 and wireless stations 130 and 135 are members of VLAN I 140; router 160 and wireless station 170 are members of VLAN II 150. Routers 120 and 160 are coupled to controller 115 through wired connection 180. Also, controller 115 is coupled to the plurality of access points 110 through wired connection 180. Multiple wireless stations, e.g. wireless stations 130, 135, and 170, are coupled to a plurality of access points 110 through wireless connection 190. Broadcast and/or multicast packets, which are originated from either router 120 or router 160, are delivered to wireless stations 130, 135, and 170 through access points 110 and controller 115. Likewise, broadcast and/or multicast packets from wireless station 130, 135, or 170 are delivered to both router 120 and router 160 through access points 110 and controller 115.

Routers 120 and 160 can be any device that forwards data packets between different interconnected telecommunications networks. Routers 120 and 160 can exchange information about destination addresses of packets. Optionally, each router can build a routing table listing preferred routes between nodes on the interconnected networks, and has interfaces to enable forwarding packets from one protocol to another protocol. Routers 120 and 160 can be coupled to wireless stations through a switch, a controller 115, and/or an access point 110.

Wireless stations 130, 135, and 170 can be any device that has the capability to use a wireless protocol, such as Institute of Electrical and Electronic Engineers (IEEE) 802.11 standard protocol. For example, a wireless station may be a laptop, a desktop personal computer, a personal digital assistant (PDA), an access point, a smartphone, and so on, with wireless capacity. Wireless stations 130, 135, and/or 170 may be fixed, mobile or portable. Generally, in wireless networking terminology, a station (STA), a wireless client, and a node are often used interchangeably, and no strict distinction existing between these terms. Wireless stations sometimes are also referred to as transmitter or receiver based on its transmission characteristics.

Access point 110 can be any wireless device that allows for connecting to a wired network using Wi-Fi, Bluetooth or related communication standards. Access point 110 usually connects to a router or a controller via a wired network, and can relay data between the wireless devices, such as computers, smart devices, or printers, and wired devices on the network.

Controller 115 can be any network device that provides centralized or distributed security policy provisioning, configuration and management of multiple access points, and/or support for various mobility services. Controller 115 can be coupled directly with access points. In some embodiments, a controller can be combined in part or in entirety with a switch, a router, an edge device, a gateway, an access point, and so on. In some embodiments, a master controller in communication with multiple controllers may provide mobility services in concert. In other embodiments, controllers can be virtual controllers rather than physical network devices.

Although FIGS. 1A and 1B illustrate a specific number of VLANs, it shall be appreciated that a system may be defined with any number of VLANs whose members are configured to receive/transmit broadcast or multicast packets through one or more access points. It shall also be appreciated that each VLAN may include any number of wireless stations. Moreover, each wireless station may be configured as a member of zero or more VLANs. Note that, when an access point communicates with multiple wireless stations from multiple VLANs, each VLAN may be associated with either a unique port of the access point, or determined based on roles derived from an authentication method such as IEEE 802.11X authentication.

Multiple VLANs can be divided from a single VLAN pool and therefore share the same Internet Protocol (IP) address space. Each VLAN in the VLAN pool is typically associated with a unique identifier. In addition to the VLAN pool, one or more application- or network protocol-specific VLANs can be created. For example, a separate and different VLAN may be created and designated specifically to an IPv6 network. Any wireless stations that are operating under and/or compatible with IPv6 can become a member of the IPv6 VLAN. Packets originated from a member of the IPv6 VLAN are delivered only to the other members of the same VLAN through multicast or broadcast.

Internet Protocol Version 6 (IPv6) Multicast Packet

Figure 2A:
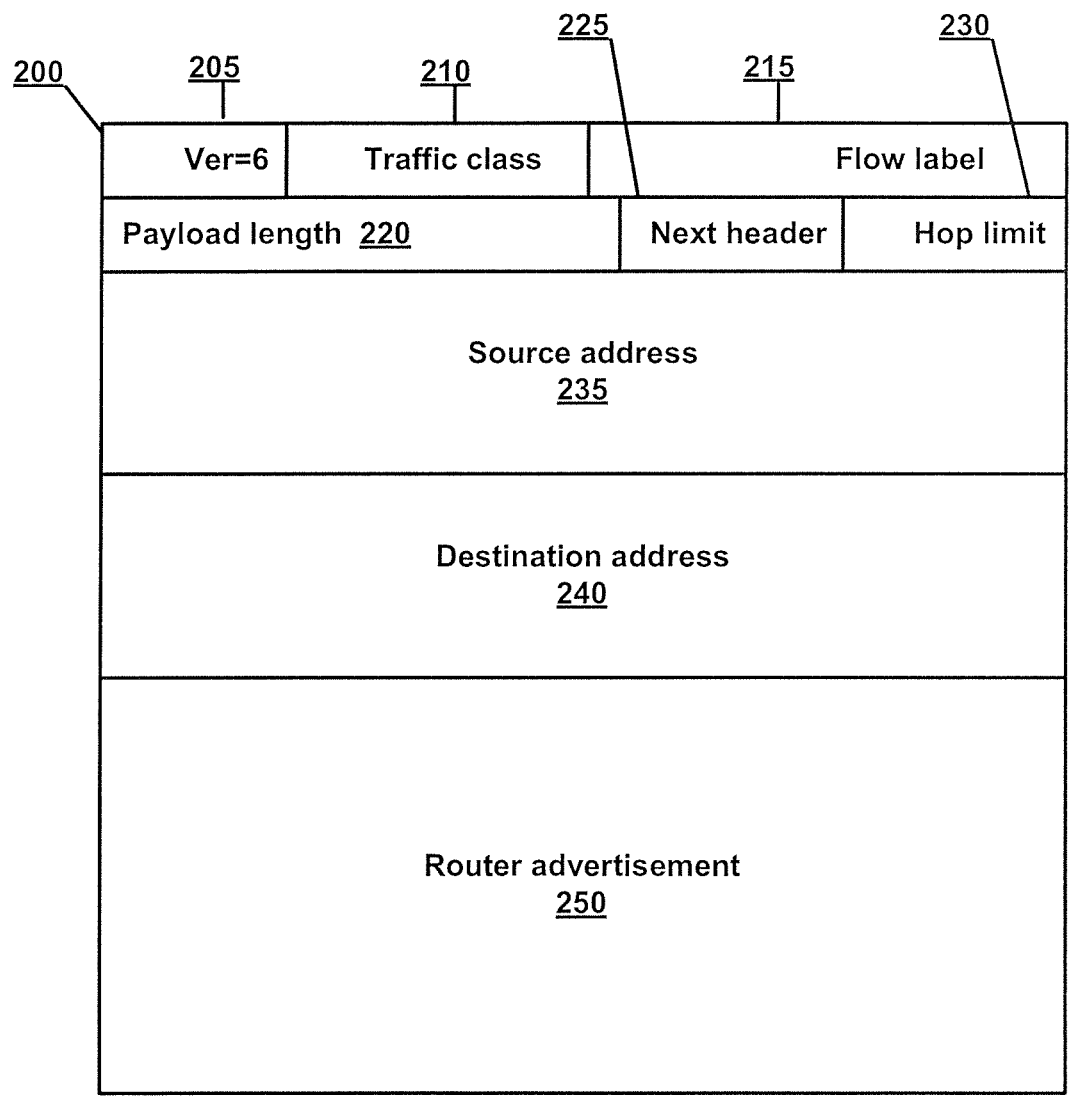
FIGS. 2A and 2B show block diagrams illustrating an exemplary multicast packet according to embodiments of the present disclosure.
Figure 2B:
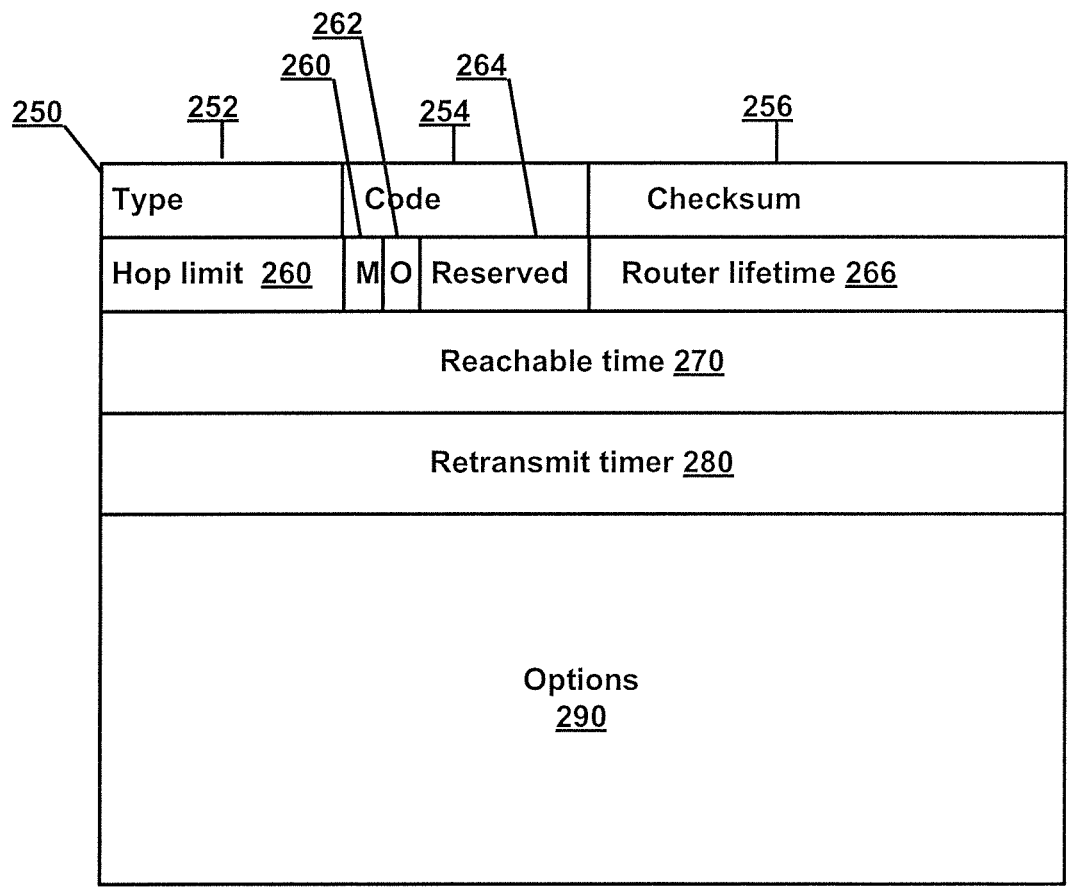

FIGS. 2A and 2B show block diagrams illustrating an exemplary multicast packet according to embodiments of the present disclosure. The packet illustrated in FIGS. 2A and 2B is defined by IPv6 protocol, however, it will be appreciated that the instant application is generally applicable to any application and/or protocol that relies on multicast or broadcast.

Packet 200 in FIG. 2A includes the following fields: version 205, traffic class 210, flow label 215, payload length 220, next header 225, hop limit 230, source address 235, destination address 240, and router advertisement 250. Note that, IPv6 options can be placed in separate IPv6 extension headers that are located after destination address 240. The IPv6 extension headers are not examined or processed by any router along a packet's delivery path until the packet arrives at its destination.

Version 205 is a four-bit field indicating the version of the Internet Protocol.

Traffic class 210 is an eight-bit field indicating traffic class in Differentiated Class of Service (DiffServ).

Flow label 215 is a twenty-bit field used to label particular flows of traffic. That is, packets that not only are originated by the same source and going to the same destination, but also belong to the same applications at the source and destination. Flow label allows for providing a finer-grained differentiated class-of-service treatment to ensure, while balancing traffic loads across multiple paths, that packets belonging to the same flow are always forwarded over the same path to prevent possible reordering of packets.

Payload length 220 is a twenty-bit field specifying the length of the payload, in bytes, that the packet is encapsulating. The payload length field can indicate a maximum of 1,048,575 bytes payload, which implies that IPv6 packets may carry a larger payload than IPv4 packets.

Next header 225 is an eight-bit field that specifies which header follows the IPv6 packet header. The header following the IPv6 packet header can be either an upper-layer protocol header or an IPv6 extension header.

Hop limit 230 is an eight-bit field, which indicates a measure of the maximum router hops a packet can take on its way to a destination. Each router decrements value of hop limit 230 by one; and if the value of hop limit 230 decrements to 0, the packet is discarded.

Source address 235 and destination address 240 are both 128-bit fields, which indicate the source address and the destination address respectively. The length of the field is defined to accommodate IPv6 addresses.

Multicast-Based Protocol—Neighbor Discovery Protocol (NDP)

A. Overview

One distinct characteristic of IPv6 is the use of Neighbor Discovery Protocol (NDP), which enables the following functions:

Router discovery: A node can discover the local routers without using Dynamic Host Configuration Protocol (DHCP) when it is connected to an IPv6 link.

Prefix discovery: A node can discover the prefix or prefixes assigned to that link when it is connected to an IPv6 link.

Parameter discovery: A node can discover parameters such as the link MTU and hop limits for its connected link.

Address autoconfiguration: A node can determine its full address without using DHCP.

Address resolution: A node can discover the link-layer addresses of other nodes on the link without the use of Address Resolution Protocol (ARP).

Next-hop determination: A node on a link can determine the link-layer next hop for a destination, either as a local destination or a router to the destination.

Neighbor unreachability detection: A node can determine when a neighbor on a link, either another host or a router, is no longer reachable.

Duplicate address detection: A node can determine if an address it wants to use is already being used by another node on the link.

Redirect: A router can notify a host of a better next-hop than itself to an off-link destination.

B. Stateless Address Autoconfiguration

A host performs several steps to autoconfigure its interfaces in IPv6. The autoconfiguration process creates a link-local address. The autoconfiguration process verifies its uniqueness on a link. The process also determines which information should be autoconfigured, and whether the addresses should be obtained through a stateless mechanism, a stateful mechanism, or both mechanisms.

Autoconfiguration is typically performed only on multicast-capable links. Autoconfiguration begins when a multicast-capable interface is enabled, for example, during system startup. Nodes, both host wireless stations and routers, begin the autoconfiguration process by generating a link-local address for the interface. A link-local address is formed by appending the interface's identifier to the link-local prefix.

A node must attempt to verify that a tentative link-local address is not already in use by another node on the link. After verification, the link-local address can be assigned to an interface. Specifically, the node sends a neighbor solicitation message that contains the tentative address as the target address. If another node is already using that target address, the other node returns a neighbor advertisement indicating that the other node is using that target address. If another node is also attempting to use the same target address, the other node also sends a neighbor solicitation for the target address. The number of neighbor solicitation transmissions or retransmissions, and the delay between consecutive solicitations, can be link specific.

If a node determines that its tentative link-local address is not unique, autoconfiguration stops and further link-local address configuration of the interface can be done manually or the system can be configured to use an alternative tentative link-local address by default. If a node determines that its tentative link-local address is unique, the node assigns the unique link-local address to the interface. At this point, the node has IP-level connectivity with neighboring nodes. Next, the host node in the stateless autoconfiguration process determines whether any routers are present; and if so, the host node obtains a router advertisement from the routers that are present in the network. In the router advertisement, a router typically specifies what type of autoconfiguration a host node should perform. If no routers are present, stateful autoconfiguration is invoked. Although routers send router advertisements periodically, to obtain an advertisement quickly, a host node may send one or more router solicitations to the all-routers in a multicast group. Because routers generate router advertisements periodically, hosts continually receive new router advertisements. Hosts process the information that is contained in each advertisement, add to the information, and also refresh the information that is received in previous advertisements.

Therefore, as described above, stateless address autoconfiguration is an exemplary protocol whose functions rely upon proper delivery of multicast messages. It shall be noted that the present disclosure is generally applicable to any applications or network protocols associated with multiple VLAN memberships.

C. Internet Control Message Protocol Version 6 (ICMPv6) Messages

NDP uses ICMPv6 to exchange messages necessary for its functions. Specifically, ICMPv6 messages used by NDP include: Router Advertisement (RA) messages, Router Solicitation (RS) messages, Neighbor Solicitation (NS) messages, Neighbor Advertisement (NA) messages, and Redirect messages. RA messages are originated by routers to advertise their presence and link-specific parameters such as link prefixes, link maximum transmission unit (MTU), and hop limits. These messages are sent periodically, and also in response to RS messages. RS messages are originated by hosts to request that a router send an RA. NS messages are originated by nodes to request another node's link layer address and also for functions such as duplicate address detection and neighbor unreachability detection. NA messages are sent in response to NS messages. If a node changes its link-layer address, it can send an unsolicited NA to advertise the new address. Redirect messages are used send data packets on an alternative route.

FIG. 2B illustrates an exemplary type of NDP multicast message, i.e. a router advertisement message. Router advertisement 250 is a message that each router can periodically send out to a multicast group to announce its availability. When a host wireless station receives router advertisements from all routers, the host wireless station can build a list of default routers. Router advertisement 250 includes a type field 252, a code field 254, a checksum field 256, a hop limit field 258, an M flag 260, an O flag 262, a reserved field 264, a router lifetime field 266, a reachable time field 270, a retransmit timer field 280, and an options field 290. The RA message's ICMPv6 type is 134, and the RA message's code is 0. Source address 235 of IPv6 packet 200 is the IPv6 link-local address of the interface from which the packet originates. Destination address 240 is either the all-nodes multicast address, i.e. "FF02::1" if the RA message is a periodic transmission, or the link-local address of the soliciting node if the RA message is sent in response to a RS message.

Hop limit 258 indicates the value of the hop limit field that nodes attached to the link should give to any packets they originate on the link. If no hop limit is specified by this router, the field is set to all zeroes.

M flag 260 is a Managed Address Configuration flag. If the M flag is set, the originating router is instructing hosts on the link to use stateful address autoconfiguration via DHCPv6. On the other hand, if the flag is cleared, hosts on the link should use stateless address autoconfiguration. O flag 262 is an Other Stateful Configuration flag. When the O flag is set, the originating router is instructing hosts on the link to use DHCPv6 for the acquisition of other link information. The M and O flags can be used together. For example, by clearing the M flag but setting the O flag, the router is instructing hosts to use stateless address autoconfiguration, but then consult a DHCPv6 server for other configuration parameters.

Router lifetime 266 specifies the lifetime of the default router in seconds, up to a maximum value of 18.2 hours. Moreover, router lifetime field 266 is set to a value other than 0 only if the originating router is a default router.

Reachable time 270 is used by the neighbor unreachability detection function of NDP. It specifies the time, in milliseconds, that a node should assume a neighbor is reachable after the node has confirmed reachability of the neighbor.

Retransmit timer 280 is used by the address resolution and neighbor unreachability detection functions of NDP. It specifies the minimum time, in milliseconds, between retransmitted Neighbor Solicitation messages.

Possible options that can be carried in the Options field 290 of the RA message include: the link-layer address of the interface from which the RA is originated; an MTU specification for the link; one or more prefixes assigned to the link. The prefix information is essential to stateless address autoconfiguration, because it tells hosts on the link what the link prefixes are.

NDP messages should always be link-local in scope by definition. Therefore, an IPv6 packet encapsulating an NDP message typically uses either link-local IPv6 addresses or multicast addresses with a link-local scope. NDP is defined in IETF RFC 2461. An exemplary format of multicast address used in the NDP messages is illustrated in Table 1 below.

TABLE 1

| 8 bits | 4 bits | 4 bits | 8 bits | 8 bits | 64 bits | 32 bits |
| --- | --- | --- | --- | --- | --- | --- |
| 11111111 | FLGS | SCOP | Reserved | Plen | Network prefix | Group ID |

The first field code "11111111" identifies the IPv6 address as a multicast address. The second field FLGS includes a set of the four flags (0, 0, P, T). The first two flags must be zero. The P bit has one of the following values:
  0=Multicast address that is not assigned based on the network prefix;
  1=Multicast address that is assigned based on the network prefix.
If the P bit is set to 1, then the T bit must also be set to 1. The FLGS bits are followed by field code "SCOP," which is followed by an 8-bit reserved field. The field "Plen" indicates the number of bits in the site prefix that identify the subnet. For a multicast address, the field value is usually assigned based on a site prefix. The Group ID filed indicates an identifier for the multicast group, either permanent or dynamic. More details about IPv6 multicast addresses are defined in IETF RFC 3306.

It shall be noted, based on the above description, that IPv6 multicast packet does not define any field directly or indirectly indicating VLAN membership information, nor is any portion of IPv6 multicast address derived or indicative of the packet originator's VLAN membership. However, from fields such as flow label 215 and version 205, it is possible for an access point, a router, and other similar network devices, to recognize packets associated with a specific application and/or network protocol.

Application- or Network Protocol-Specific Multicast in Multiple VLANs

Figure 3:
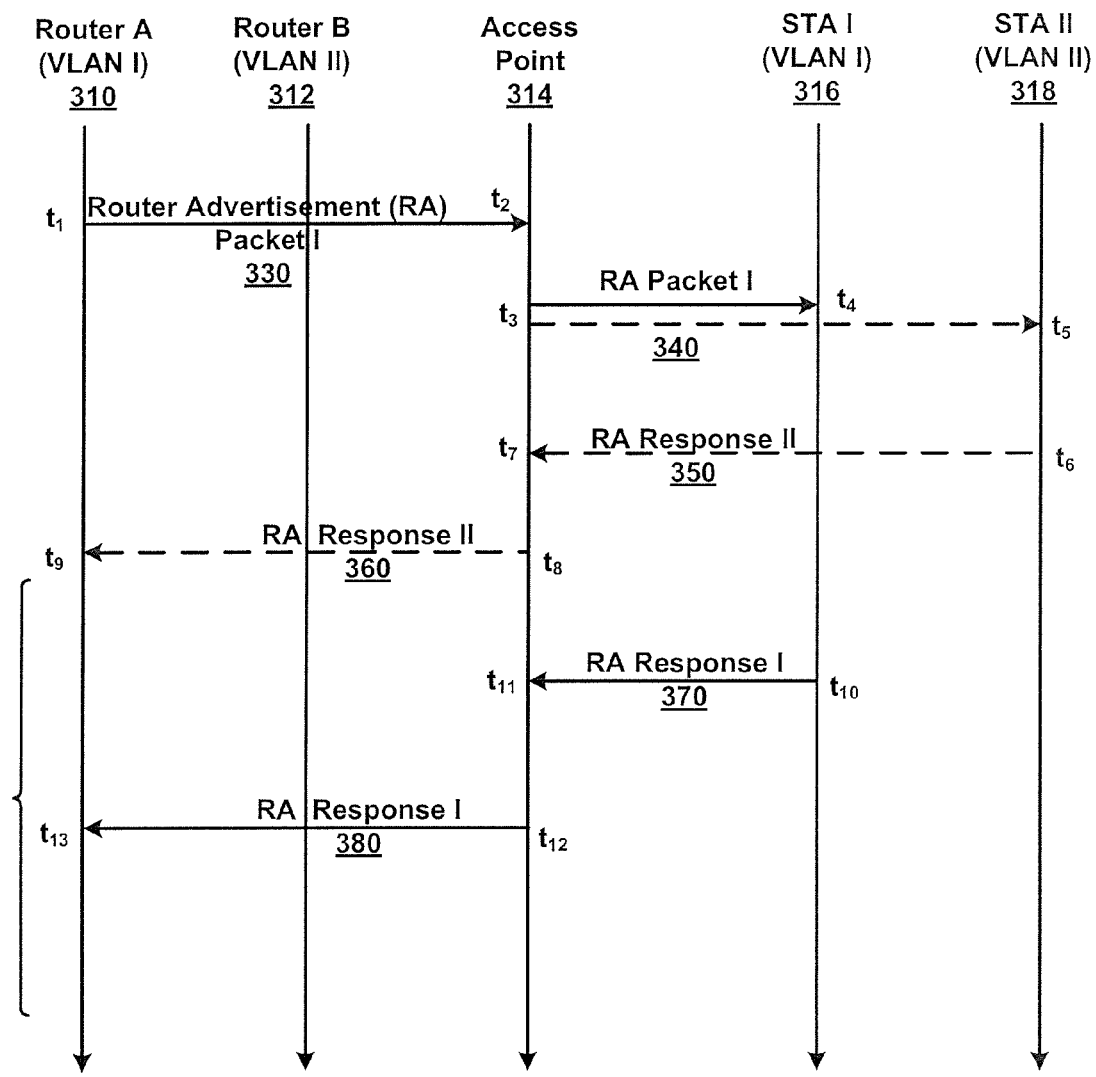
FIG. 3 is a sequence diagram illustrating an exemplary multicast communication process between multiple hosts on different VLANs according to embodiments of the present disclosure.

FIG. 3 is a sequence diagram illustrating an exemplary multicast communication process between multiple hosts on different VLANs according to embodiments of the present disclosure. FIG. 3 includes two routers, namely Router A 310 and Router B 312, Access Point 314, and two wireless stations, namely STA I 316 and STA II 318. Router A 310 and STA I both belong to one VLAN, i.e., VLAN I. Also, Router B 312 and STA II both belong to another VLAN, i.e., VLAN II.

In the wireless communication exchanges illustrated in FIG. 3, at time $t_1$, Router A sends a multicast message RA Packet I 330. RA Packet I 330 is received by Access Point 314 at time $t_2$, and is subsequently forwarded to wireless stations (such as STA I 316 and STA II 318) connected to Access Point 314 at time $t_3$. For illustration purposes only, let us assume that STA I 316 receives the forwarded RA Packet I 340 at time $t_4$ and STA II 318 receives the forwarded RA Packet I 340 at time $t_5$. Note that, neither STA I 316, which belongs to VLAN I, nor STA II 318, which belongs to VLAN II, is able to distinguish the VLAN membership of Router A 310, which is the originator of RA Packet I 330. Let us further assume for illustration purposes that STA II 318 responds to the RA Packet I 340 first. Thus, RA Response II 350 is sent from STA II 318 at time $t_6$ and received by Access Point 314 at time $t_7$. This happens because STA II 318 has no knowledge of the VLAN membership of Router A 310, that is, the originator of the received RA Packet I 340. Neither can STA II 318 acquire any information about the VLAN membership of Router A 310 from any fields of RA Packet I 340. Thus, STA II 318, which is a member of VLAN II, does not know that Router A 310 belongs to VLAN I. Accordingly, instead of discarding RA Packet I 340 originated from a VLAN I member, VLAN II member STA II 318 responds to RA Packet I 340 by sending RA Response II 350.

Conventionally, upon receiving such response, Access Point 314 further transmits RA Response II 360 at time $t_8$ to network nodes such as Router A 310 and Router B 312. After Router A 310 receives RA Response II 360 from Access Point 314 at time $t_9$, Router A 310 may discover a mismatch due to the difference in VLAN memberships of the source and the destination, and may decide to discard any further multicast messages from Access Point 314 after time $t_9$. Assuming that, STA I 316 later sends a message RA Response I 370 at time $t_{10}$, and that RA Response I 370 is received by Access Point 314 at time $t_{11}$ and is delivered to other network nodes as RA Response I 380 by Access Point 314 at time $t_{12}$. As discussed above, Router A 310 will erroneously discard RA Response I 380 upon receiving it at time $t_{13}$ because it is a message from Access Point 316.

With the improved technology disclosed in the present disclosure, an application- or network protocol-specific VLAN is created. For example, a dedicated and separate VLAN can be created specifically for IPv6 network applications. Access Point 314 can determine which received packets are IPv6 multicast packets, for example, based on the version and/or address fields of the received packets, and will always deliver IPv6 packets via multicast or broadcast to the dedicated VLAN regardless of VLAN membership of packet originator or destination. Thus, an application or network protocol specific multicast group is dynamically created and managed.

In the example illustrated in FIG. 3, if STA II 318 is on an IPv4 network and RA Response II 350 is an IPv4 packet, then RA Response II 350 will not be forwarded via multicast to the dedicated IPv6 VLAN. When Access Point 314 receives an IPv6 packet RA Packet I 330 at time $t_2$, Access Point 314 will forward the IPv6 packet to the dedicated IPv6 VLAN. Therefore, only IPv6 compatible devices such as wireless station STA I 316 can hear packet multicast to IPv6 VLAN. Because STA II 318 is on an IPv4 network, when Access Point 314 sends multicast packet RA Packet I 340, STA II 318 will not receive RA Packet I 340, and thus will not respond to it. Likewise, when an IPv6 compatible device STA I 316 receives and responds to a received IPv6 packet, Access Point 314 will forward the IPv6 packet RA Response I 370 from STA I 316 to the dedicated IPv6 VLAN. Thus, only IPv6 compatible routers, such as Router A 310, will receive the forwarded IPv6 multicast packet RA Response I 380.

Application- or Network Protocol-Specific VLAN Membership Management

Figure 4:
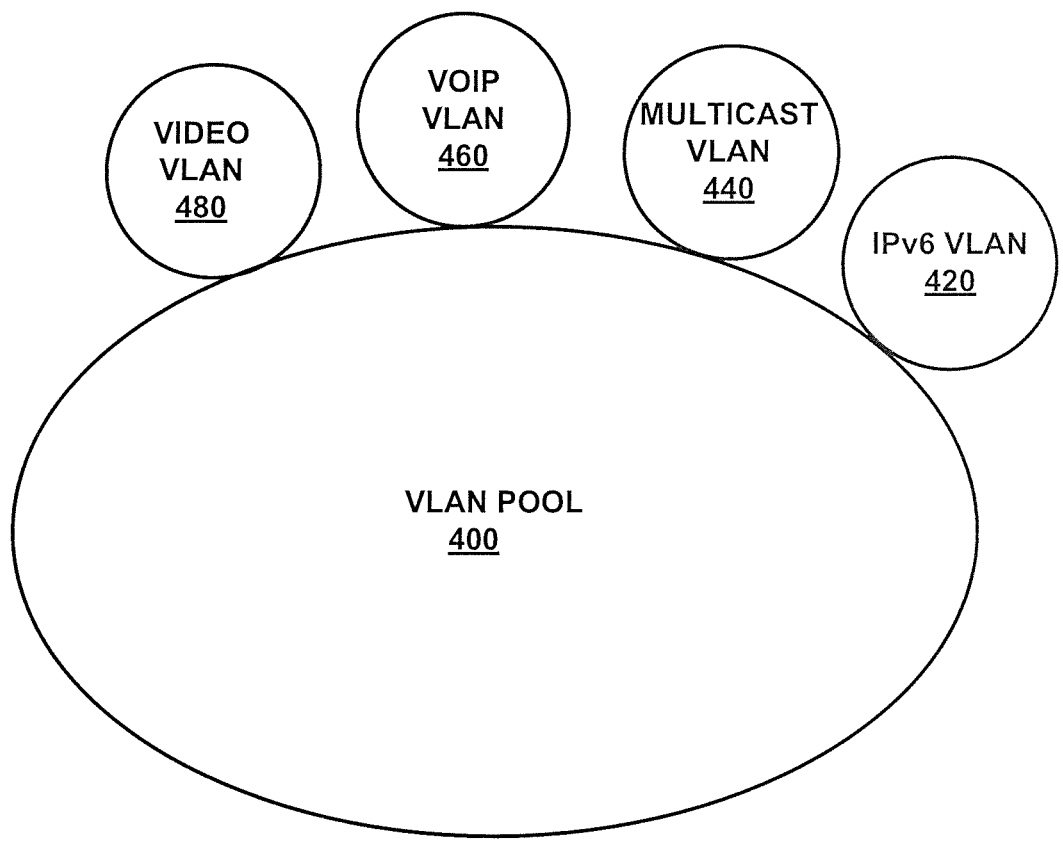
FIG. 4 is a diagram illustrating an exemplary application- or network protocol-specific VLAN according to embodiments of the present disclosure.

FIG. 4 is a diagram illustrating an exemplary application- or network protocol-specific VLAN according to embodiments of the present disclosure. FIG. 4 includes VLAN pool 400, IPv6 VLAN 420, Multicast VLAN 440, VoIP VLAN 460, and Video VLAN 480. VLAN pool 400 can be divided into multiple VLANs, all of which can share the same Internet Protocol (IP) address space. Each VLAN in VLAN pool 400 is typically associated with a unique identifier.

In addition to the VLAN pool, according to embodiments of the present disclosure, one or more application- or network protocol-specific VLANs are created. For example, in one embodiment, IPv6 VLAN 420 is a separate and different VLAN that is created and designated specifically to IPv6 network. Any wireless stations that are operating under and/or compatible with IPv6 protocol can become a member of the IPv6 VLAN. Packets originated from a member of the IPv6 VLAN are delivered only to the other members of the same VLAN through multicast or broadcast. When a dedicated VLAN is involved, e.g., when an access point identifies a packet as an IPv6 packet, the multicast group address specified in the packet can be overridden by the multicast group dynamically formed by members of the dedicated VLAN. Thus, the received packets will always be delivered to the dedicated VLAN by the access point if they are identified as specific to a predefine application or network protocol based on values of fields in the headers of the packets.

In other embodiments, a separate and dedicated VLAN can be created for multicast packets that are not limited to IPv6 (e.g., Multicast VLAN 440), VoIP packets (e.g., VoIP VLAN 460), video streaming packets (e.g., Video VLAN 480), and so on. However, it shall be noted that, for each specific application or network protocol, only a single dedicated VLAN is allowed to be created. This helps avoiding the problems described above with regards to conventional VLAN membership management.

In some embodiments, the separate and dedicated application- and/or network protocol-specific VLAN is created outside VLAN pool 400 as illustrated in FIG. 4. In other embodiments, the separate and dedicated application- and/or network protocol-specific VLAN can be designated from an existing VLAN pool.

VLAN Membership Management Process

Figure 5:
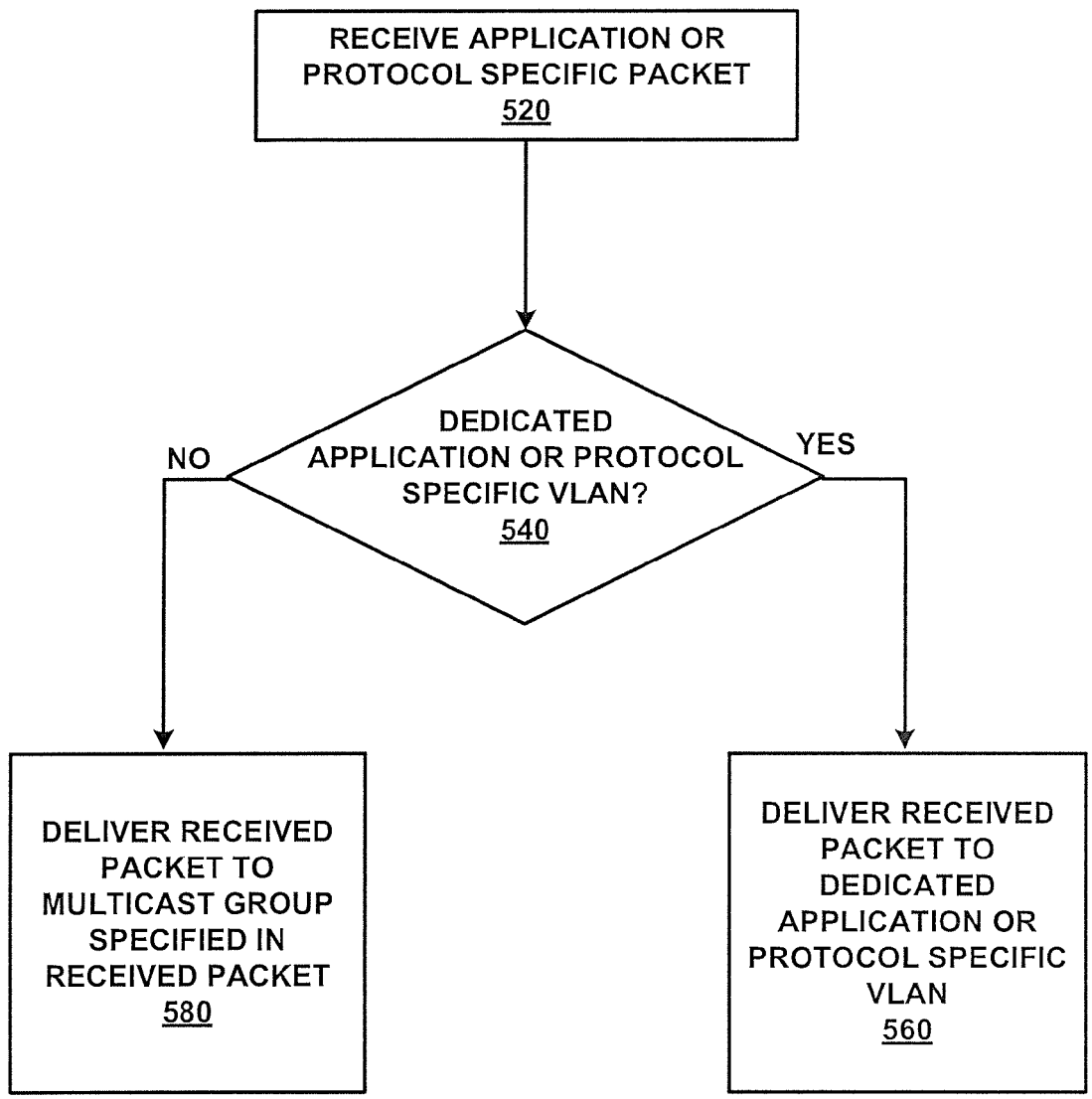
FIG. 5 is a flowchart illustrating a process for managing multiple VLAN memberships according to embodiments of the present disclosure.

FIG. 5 is a flowchart illustrating a process for managing multiple VLAN memberships according to embodiments of the present disclosure. The process starts from a network device receiving a packet from a wireless station which is a member of a VLAN (operation 520). In some embodiments, the VLAN is associated with a VLAN pool. The VLAN pool is a group of VLANs, each of which is divided from a common address space. In some embodiments, the network device may further receive another packet from another wireless station which a member of another VLAN that is also associated with the same VLAN pool. In some embodiments, the received packet is a multicast packet or a broadcast packet. In other embodiments, the received packet can be a unicast packet. In some embodiments, the received packet is associated with a specific version of Internet Protocol, such as, IPv6, or a network protocol that involves multicast and/or broadcast, etc. In other embodiments, the received packet is associated with a specific application, such as a VoIP application, or a video streaming application, etc.

Next, the network device determines whether the received packet is associated with the predefined application or network protocol (operation 540). In some embodiments, the network device extracts a portion of a header of the received packet, and determines whether the received packet is associated with the predefined application or network protocol. In some embodiments, the extracted portion of the header includes one or more of: version information, packet flow information, payload information, a type, a flag, a source address, and a destination address.

If the received packet is determined to be associated with the predefined application or network protocol, the network device delivers the received packet to the dedicated VLAN that is specific to the predefined application or network protocol (operation 560). Note that, the dedicated VLAN is accessible only to network devices that are associated with the predefined application or network protocol. In some embodiments, the network device delivers the received packet to the dedicated VLAN regardless of the destination address(es) specified within the packet.

If the received packet is determined not to be associated with the predefined application or network protocol, the network device delivers the received packet to an address or a group of addresses specified in a header of the received packet (operation 580).

In some embodiments, the network device can further determine that another received packet is associated with another predefined application or network protocol. In response, the network device will deliver the other received packet to a different dedicated VLAN which is accessible only to network devices associated with the second predefined application or network protocol.

In some embodiments, the dedicated VLAN can be selected from the VLAN pool. In other embodiments, the corresponding address space of the dedicated VLAN is outside the address space of the VLAN pool. In one embodiment, each dedicated VLAN specific to an application or network protocol corresponds to a distinct address space that is outside the address space of the VLAN pool when multiple dedicated VLANs are created.

VLAN Membership Management System

Figure 6:
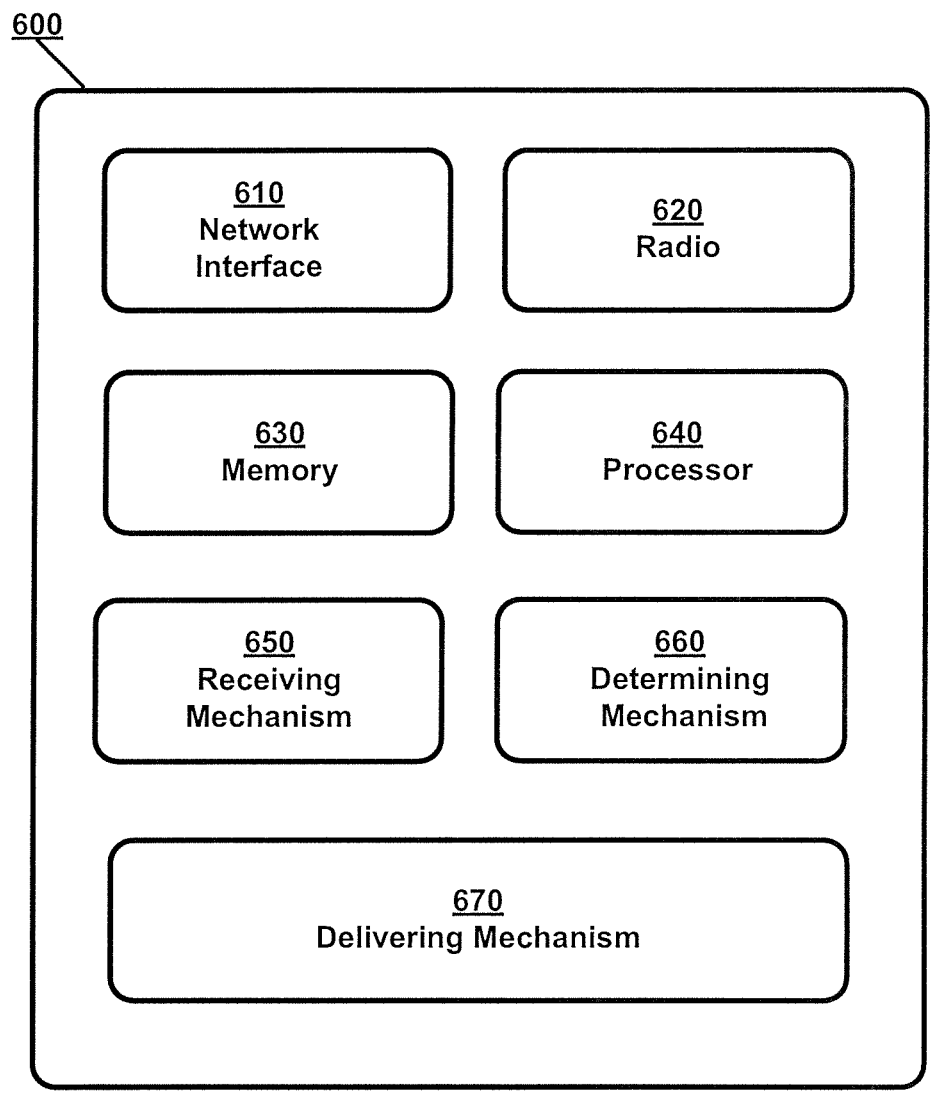
FIG. 6 is a block diagram illustrating a system for managing multiple VLAN memberships according to embodiments of the present disclosure.

FIG. 6 is a block diagram illustrating a system for managing multiple VLAN memberships according to embodiments of the present disclosure.

Operating as an access point 110 or controller 115 in FIGS. 1A and 1B, network device 600 includes a network interface 610 capable of communicating to a wired or wireless network, at least one or more radio antennas 620 capable of either transmitting or receiving radio signals or both, a memory 630 capable of storing instructions and data, and a processor 640 capable of processing computing instructions. Moreover, network device 600 further includes a receiving mechanism 650, a determining mechanism 660, and a delivering mechanism 670, all of which are coupled to the processor and the memory in network device 600. Network device 600 may be used as a client system, or a server system, or may serve both as a client and a server in a distributed or a cloud networking system.

Network interface 610 can be any communication interface, which includes but is not limited to, a modem, token ring interface, Ethernet interface, wireless IEEE 802.11 interface, cellular wireless interface, satellite transmission interface, or any other interface for coupling network devices.

Radio 620 may be any combination of known or convenient electrical components, including but not limited to, transistors, capacitors, resistors, multiplexers, wiring, registers, diodes or any other electrical components known or later become known.

Memory 630 can include storage components, such as, Dynamic Random Access Memory (DRAM), Static Random Access Memory (SRAM), etc. In one embodiment, memory 630 stores a unique address identifier associated with a wireless client device in a list, which indicates wireless client devices in the wireless network that are capable of communicating on the first wireless communication band. Processor 640 can include one or more microprocessors and/or network processors.

Receiving mechanism 650 can receive one or more packets as described in the present disclosure. In one embodiment, receiving mechanism 650 receives a packet from a wireless station which is a member of a VLAN. In some embodiments, the VLAN is associated with a VLAN pool. The VLAN pool is a group of VLANs, each of which is divided from a common address space. In some embodiments, the network device may further receive another packet from another wireless station which a member of another VLAN that is also associated with the same VLAN pool. In some embodiments, the received packet is a multicast packet or a broadcast packet. In other embodiments, the received packet can be a unicast packet. In some embodiments, the received packet is associated with a specific version of Internet Protocol, such as, IPv6, or a network protocol that involves multicast and/or broadcast, etc. In other embodiments, the received packet is associated with a specific application, such as a VoIP application, or a video streaming application, etc.

Determining mechanism 660 is configured to determine whether the received packet is associated with the predefined application or network protocol. In some embodiments, determining mechanism 660 extracts a portion of a header of the received packet, and determines whether the received packet is associated with the predefined application or network protocol. In some embodiments, the extracted portion of the header includes one or more of: version information, packet flow information, payload information, a type, a flag, a source address, and a destination address.

Collectively operating with receiving mechanism 650, determining mechanism 660, delivering mechanism 670 delivers the received packet to the dedicated VLAN that is specific to the predefined application or network protocol if the received packet is determined to be associated with the predefined application or network protocol. Note that, the dedicated VLAN is accessible only to network devices that are associated with the predefined application or network protocol. In some embodiments, delivering mechanism 670 delivers the received packet to the dedicated VLAN regardless of the destination address(es) specified within the packet.

In some embodiments, the dedicated VLAN can be selected from the VLAN pool. In other embodiments, the corresponding address space of the dedicated VLAN is outside the address space of the VLAN pool. In one embodiment, each dedicated VLAN specific to an application or network protocol corresponds to a distinct address space that is outside the address space of the VLAN pool when multiple dedicated VLANs are created.

On the other hand, delivering mechanism 670 delivers the received packet to an address or a group of addresses specified in a header of the received packet if the received packet is determined not to be associated with the predefined application or network protocol.

In some embodiments, determining mechanism 660 can further determine that another received packet is associated with another predefined application or network protocol. In response, delivering mechanism 670 will deliver the other received packet to a different dedicated VLAN which is accessible only to network devices associated with the second predefined application or network protocol.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "access point" (AP) generally refers to receiving points for any known or convenient wireless access technology which may later become known. Specifically, the term AP is not intended to be limited to IEEE 802.11-based APs. APs generally function to allow wireless devices to connect to a wired network via various communications standards.

As used herein, the term "mechanism" generally refers to a component of a system or device to serve one or more functions, including but not limited to, software components, electronic components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. The description is thus to be regarded as illustrative rather than limiting.

What is claimed is:

1. A method comprising:
   receiving, at a network device, a first packet from a first wireless station, wherein the first wireless station is a member of a first virtual local area network (VLAN);
   determining, by the network device, whether the first packet is associated with the Internet Protocol version 6 (IPv6) network protocol and a specific application; and
   in response to determining that the first packet is associated with the IPv6 network protocol and the specific application, overriding a multicast group destination address specified in the first packet regardless of a VLAN membership of an originator of the first packet and regardless of a VLAN membership of the multicast group destination of the packet and delivering, by the network device, the first packet to a first dedicated VLAN, associated with a different multicast group destination address than the multicast group destination address specified in the first packet, that is accessible only to network devices associated with the IPv6 network protocol and the specific application, wherein the first dedicated VLAN differs from the first VLAN.

2. The method of claim 1, further comprising:
   delivering, by the network device, the first packet to an address or a group of addresses specified in a header of the first packet in response to a determination that the first packet is not associated with the IPv6 network protocol.

3. The method of claim 1, wherein the first VLAN is associated with a VLAN pool, and wherein a corresponding address space of the first dedicated VLAN is outside of an address space of the VLAN pool.

4. The method of claim 3, further comprising:
   receiving, at the network device, a second packet from a second wireless station, wherein the second wireless station is a member of a second VLAN, and wherein the second VLAN is associated with the VLAN pool.

5. The method of claim 1, further comprising:
   receiving, at the network device, a second packet;
   determining, by the network device, that the second packet is associated with a second predefined network protocol; and
   delivering, by the network device, the second packet to a second dedicated VLAN that is accessible only to network devices associated with the second predefined network protocol.

6. The method of claim 5, wherein the first VLAN is associated with a VLAN pool and wherein corresponding address spaces of both the first dedicated VLAN and the second dedicated VLAN are outside of an address space of the VLAN pool.

7. The method of claim 5, wherein the first VLAN is associated with a VLAN pool and wherein the first or the second dedicated VLAN is selected from the VLAN pool.

8. The method of claim 3, wherein the first packet is a multicast or broadcast packet.

9. The method of claim 8, wherein the first packet is an IPv6 packet.

10. The method of claim 1, wherein determining whether the first packet is associated with the IPv6 network protocol further comprises:
    extracting a portion of header from the first packet; and
    determining that the first packet is associated with the IPv6 network protocol based on the extracted portion of header.

11. A network device comprising:
    a processor; and
    a memory on which is stored machine readable instructions that are to cause the processor to:
      receive a first packet from a first wireless station, wherein the first wireless station is a member of a first virtual local area network (VLAN);
      determine whether the first packet is associated with the Internet Protocol version 6 (IPv6) network protocol and a specific application; and
      in response to determining that the first packet is associated with the IPv6 network protocol and the specific application, override a multicast group destination address specified in the first packet regardless of a VLAN membership of an originator of the first packet and regardless of a VLAN membership of the multicast group destination of the packet and deliver the first packet to a first dedicated VLAN, associated with a different multicast group destination address than the a multicast group destination address specified in the first packet, that is accessible only to network devices associated with the IPv6 network protocol and the specific application, wherein the first dedicated VLAN differs from the first VLAN.

12. The network device of claim 11, wherein the machine readable instructions are further to cause the processor to deliver the first packet to the first VLAN in response to a determination that the first packet is not associated with the IPv6 network protocol.

13. The network device of claim 11, wherein the first VLAN is associated with a VLAN pool, and wherein a corresponding address space of the first dedicated VLAN is outside of an address space of the VLAN pool.

14. The network device of claim 11, wherein the machine readable instructions are further to cause the processor to:
receive a second packet;
determine that the second packet is associated with a second predefined network protocol; and
deliver the second packet to a second dedicated VLAN that is accessible only to network devices associated with the second predefined network protocol, wherein the first VLAN is associated with a VLAN pool and wherein corresponding address spaces of both the first dedicated VLAN and the second dedicated VLAN are outside of an address space of the VLAN pool.

15. A non-transitory computer readable storage medium on which is stored machine readable instructions that when executed by a processor are to cause the processor to:

receive a first packet from a first wireless station, wherein the first wireless station is a member of a first virtual local area network (VLAN);

determine whether the first packet is associated with the Internet Protocol version 6(IPv6) network protocol and a specific application; and in response to determining that the first packet is associated with the IPv6 network protocol and the specific application, override a multicast group destination address specified in the first packet regardless of a VLAN membership of an originator of the first packet and regardless of a VLAN membership of the multicast group destination of the packet and deliver the first packet to a first dedicated VLAN, associated with a different multicast group destination address than the multicast group destination address specified in the first packet, that is accessible only to network devices associated with the IPv6 network protocol and the specific application, wherein the first dedicated VLAN differs from the first VLAN, wherein the first VLAN is associated with a VLAN pool, and wherein a corresponding address space of the first dedicated VLAN is outside of an address space of the VLAN pool.

* * * * *